(12) United States Patent
Kudo et al.

(10) Patent No.: US 9,356,453 B2
(45) Date of Patent: May 31, 2016

(54) BATTERY MONITORING AND CONTROL INTEGRATED CIRCUIT AND BATTERY SYSTEM

(75) Inventors: Akihiko Kudo, Hitachinaka (JP); Mutsumi Kikuchi, Hitachinaka (JP); Akihiko Emori, Tokyo (JP); Akihiro Machida, Hitachinaka (JP)

(73) Assignee: Hitachi Automotive Systems, Ltd., Ibaraki (JP)

(*) Notice: Subject to any disclaimer, the term of this patent is extended or adjusted under 35 U.S.C. 154(b) by 165 days.

(21) Appl. No.: 14/367,739

(22) PCT Filed: Dec. 20, 2011

(86) PCT No.: PCT/JP2011/079512
§ 371 (c)(1),
(2), (4) Date: Jun. 20, 2014

(87) PCT Pub. No.: WO2013/094015
PCT Pub. Date: Jun. 27, 2013

(65) Prior Publication Data
US 2015/0155722 A1  Jun. 4, 2015

(51) Int. Cl.
*H02J 7/00* (2006.01)

(52) U.S. Cl.
CPC ............ *H02J 7/0021* (2013.01); *H02J 7/0014* (2013.01); *Y02T 10/7055* (2013.01)

(58) Field of Classification Search
CPC ........................................... Y02E 60/12
USPC .......................................... 320/116
See application file for complete search history.

(56) References Cited

U.S. PATENT DOCUMENTS

| 5,939,855 A * | 8/1999 | Proctor | H02J 7/0073 320/104 |
| 2013/0134926 A1* | 5/2013 | Yoshida | H01M 10/44 320/107 |

FOREIGN PATENT DOCUMENTS

| JP | 2005-318750 A | 11/2005 |
| JP | 2011-166867 A | 8/2011 |
| JP | 2011-217606 A | 10/2011 |
| JP | 2011-229392 A | 11/2011 |

* cited by examiner

*Primary Examiner* — Suresh Memula
(74) *Attorney, Agent, or Firm* — Volpe and Koenig, P.C.

(57) ABSTRACT

A battery monitoring and control integrated circuit is connected to a cell group having a plurality of series-connected single cells for monitoring and controlling the single cells, and includes: a first start input terminal for connecting to a DC signal generation circuit which generates a DC signal based on an AC start signal input from the outside; a start detection unit which detects the DC signal and activates the battery monitoring and control integrated circuit; and a start output unit which outputs the AC start signal to the outside after the activation of the battery monitoring and control integrated circuit.

8 Claims, 10 Drawing Sheets

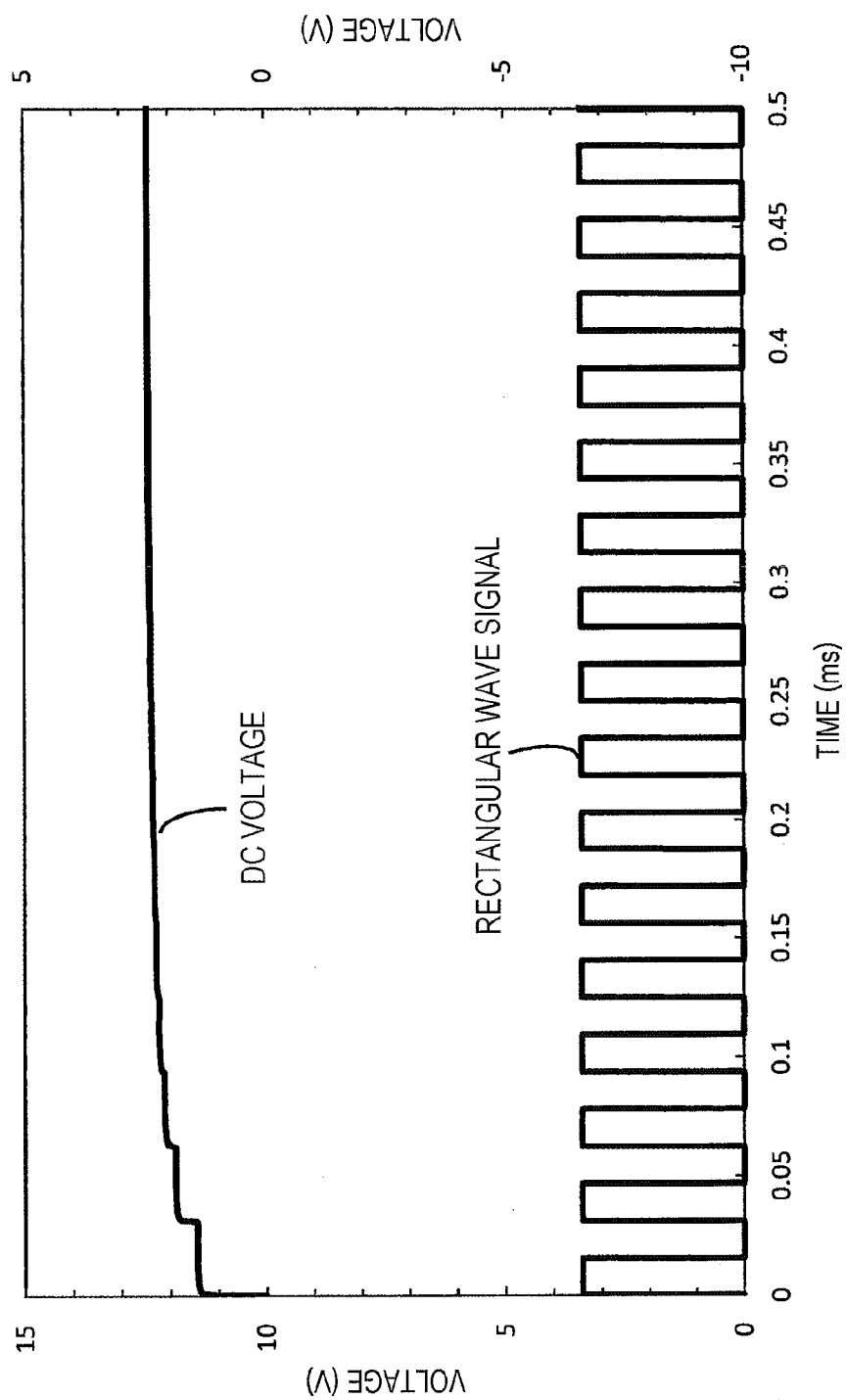

BATTERY MONITORING AND CONTROL INTEGRATED CIRCUIT AND BATTERY SYSTEM

TECHNICAL FIELD

The present invention relates to a battery monitoring and control integrated circuit and a battery system including the battery monitoring and control integrated circuit.

BACKGROUND ART

An assembled battery (battery system) configured by connecting a plurality of secondary single cells in series is used for a hybrid electric vehicle (HEV), an electric vehicle (EV), or the like to secure a desired high voltage. Such an assembled battery uses a control IC which monitors the states of the single cells and controls the states of charge and discharge, and a battery controller which controls the control IC to manage each single cell (see PTL 1).

In the battery system of PTL 1, four single cells constitute one battery cell group, and a control IC is connected to each battery cell group. A control IC at the highest level connected to a battery cell group on the highest potential side is activated in response to a start signal from the battery controller, and outputs, to a control IC one level below, the start signal at a voltage in accordance with the potential of a battery cell group corresponding to the control IC one level below. Such an operation is performed sequentially from a control IC at a higher level to a control IC at a lower level to activate all the control ICs.

CITATION LIST

Patent Literature

PTL 1: JP 2005-318750 A

SUMMARY OF INVENTION

Technical Problem

At the activation of the battery system, each control IC but a control IC at the highest level is fed a start signal at a higher voltage than its operating power supply from another control IC at a higher level. Therefore, it is necessary for each control IC to be provided with special circuits for inputting/outputting a start signal, such as a dedicated interface circuit and a protection circuit, to enable a normal operation even if such a start signal is input.

Solution to Problem

A battery monitoring and control integrated circuit according to a first aspect of the present invention is connected to a cell group having a plurality of series-connected single cells for monitoring and controlling the single cells, and includes: a first start input terminal for connecting to a DC signal generation circuit which generates a DC signal based on an AC start signal input from the outside; a start detection unit which detects the DC signal and activates the battery monitoring and control integrated circuit; and a start output unit which outputs the AC start signal to the outside after the activation of the battery monitoring and control integrated circuit.

According to a second aspect of the present invention, it is preferred in the battery monitoring and control integrated circuit of the first aspect that the DC signal generation circuit be a doubler rectifier circuit.

According to a third aspect of the present invention, it is more preferred in the battery monitoring and control integrated circuit of the second aspect that the doubler rectifier circuit include a rectifying element built in the battery monitoring and control integrated circuit.

According to a fourth aspect of the present invention, the battery monitoring and control integrated circuit of any of the first to third aspects may further include a second start input terminal for inputting a DC start signal input from the outside. It is preferred in the battery monitoring and control integrated circuit that the DC start signal input into the second start input terminal be input into the start detection unit not via the DC signal generation circuit.

A battery system according to a fifth aspect of the present invention includes a plurality of cell groups each having a plurality of series-connected single cells; a plurality of battery monitoring and control integrated circuits which is respectively connected to the plurality of cell groups and monitors and controls the single cells of the cell groups; and a battery controller which controls the plurality of battery monitoring and control integrated circuits. It is preferred in the battery system that the plurality of battery monitoring and control integrated circuits be connected to each other via capacitors in a predetermined communication order. Moreover, it is preferred that the plurality of battery monitoring and control integrated circuits each include: a first start input terminal for connecting to a DC signal generation circuit which generates a DC signal based on an AC start signal input from the battery controller or a battery monitoring and control integrated circuit at a higher level in the communication order; a start detection unit which detects the DC signal and activates the battery monitoring and control integrated circuit; and a start output unit which outputs the AC start signal to a battery monitoring and control integrated circuit at a lower level in the communication order or the battery controller after the activation of the battery monitoring and control integrated circuit.

According to a sixth aspect of the present invention, it is preferred in the battery system of the fifth aspect that the DC signal generation circuit be a doubler rectifier circuit.

According to a seventh aspect of the present invention, it is more preferred in the battery system of the sixth aspect that the doubler rectifier circuit include a rectifying element built in the battery monitoring and control integrated circuit.

According to an eighth aspect of the present invention, in the battery system of any of the fifth to seventh aspects, the plurality of battery monitoring and control integrated circuits may each further include a second start input terminal for inputting a DC start signal input from the battery controller. It is preferred in the battery system that the DC start signal input into the second start input terminal be input into the start detection unit not via the DC signal generation circuit.

Advantageous Effects of Invention

According to the invention, the need of special circuits for inputting/outputting a start signal can be eliminated in a battery monitoring and control integrated circuit which monitors and controls a battery.

BRIEF DESCRIPTION OF DRAWINGS

FIG. 9 is an equivalent circuit diagram corresponding to a cell group connected to diodes 216, a capacitor 403, a capacitor 406, and the integrated circuit 300a.

FIG. 10 is a diagram illustrating a voltage waveform example of a rectangular wave signal output from a start output terminal WU_Tx of the integrated circuit 300a, and a DC voltage applied to a start detection unit 215 of the integrated circuit 300b.

DESCRIPTION OF EMBODIMENTS

An embodiment of the present invention is hereinafter described with reference to the drawings. The embodiment described below is an example where the present invention is applied to a battery system used for a hybrid electric vehicle (HEV) or the like. The present invention can be widely applied to various battery systems to be mounted on a plug-in hybrid electric vehicle (PHEV), an electric vehicle (EV), a railway vehicle, and the like, not limited to HEV.

In the following example, a lithium-ion battery having voltage within a range of 3.0 to 4.2 V (average output voltage: 3.6 V) is assumed to be an electric storage/discharge device as a minimum unit of control. However, the electric storage/discharge device may be, other than the lithium-ion battery, any electricity storable and dischargeable device which controls its use if the SOC (State of Charge) is too high (overcharge) or too low (over-discharge). Here, it is collectively called an electric cell or a single cell.

In the embodiment described below, a plurality of (roughly several to a dozen or so) single cells connected in series is called a cell group. A plurality of the cell groups connected in series is called a battery module. Furthermore, a plurality of the cell groups or battery modules connected in series or series-parallel is designated as an assembled battery. Each cell group is provided with an integrated circuit which detects the cell voltage of each single cell, and monitors and controls the battery status while performing a balancing operation and the like.

Figure 1:
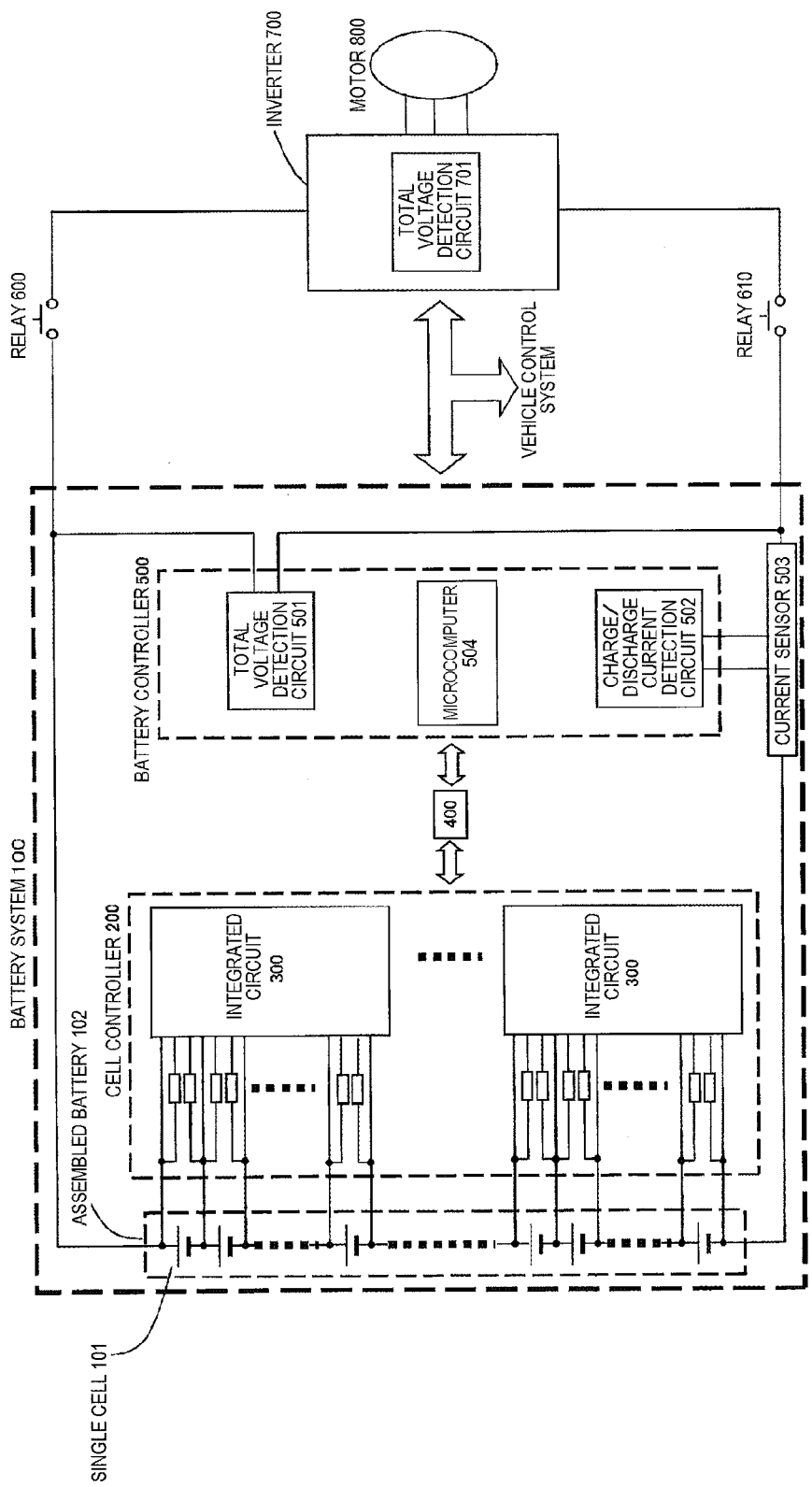
FIG. 1 is a diagram illustrating a configuration example of a hybrid electric vehicle including a battery system according to the present invention.

Firstly, a description is given of an example where the battery system according to the present invention is applied to a drive system for a hybrid electric vehicle with reference to FIG. 1. FIG. 1 is a diagram illustrating a configuration example of a hybrid electric vehicle including the battery system according to the present invention.

A battery system 100 is connected to an inverter 700 via relays 600 and 610. The inverter 700 is connected to a motor 800. At the start or acceleration of the vehicle, the battery system 100 supplies discharge power through the inverter 700 to the motor 800 to assist an unillustrated engine. At the stop or deceleration of the vehicle, the battery system 100 is charged with the regenerated power from the motor 800 through the inverter 700. The inverter 700 includes an inverter circuit having a plurality of semiconductor switching elements, a gate driving circuit for the semiconductor switching element, and a motor controller which generates a pulse signal to perform PWM control on the gate driving circuit. However, they are omitted in FIG. 1

The battery system 100 is mainly configured by an assembled battery 102 constituted by a plurality of single cells 101 being lithium-ion batteries, a cell controller 200 including a plurality of battery monitoring and control integrated circuits 300 which detects voltages of the single cells 101 on a cell group basis and performs a balancing discharge operation and the like, and a battery controller 500 which controls the operation of the cell controller 200 and determines the states of the single cells 101. In the example of the battery system 100 illustrated in the embodiment, 96 series-connected lithium-ion batteries with a rated capacity of 5.5 Ah are used as the single cells 101. The battery controller 500 communicates with the plurality of integrated circuits 300 via an insulating element group 400 and controls the plurality of integrated circuits 300. The integrated circuit 300 is provided for each cell group as described above. A voltage detection line between the assembled battery 102 and the cell controller 200 is connected by an unillustrated connector to the cell controller 200.

The battery controller 500 includes a total voltage detection circuit 501 which measures the total voltage of the assembled battery 102, a charge/discharge current detection circuit 502 which is connected to a current sensor 503 for detecting a charge/discharge current flowing through the assembled battery 102, and a microcomputer 504 which communicates with the cell controller 200, the inverter 700, and an unillustrated high-level vehicle controller, and controls the entire battery controller 500. The total voltage detection circuit 501 does not need to be provided inside the battery controller 500 as in FIG. 1 as long as the total voltage of the assembled battery 102 can be measured.

A total voltage detection circuit 701 which detects the total voltage of the assembled battery 102 is also provided inside the inverter 700. Moreover, although not illustrated in FIG. 1, the battery controller 500 makes a temperature correction of the parameter of the battery status based on the temperature of the single cell 101 measured by a temperature detection circuit connected to the integrated circuit 300.

Although omitted in FIG. 1, the cell controller 200 and the battery controller 500 are provided on one board, and housed in a metal case. Moreover, the assembled battery 102 is also housed in a metal case. The cell controller 200 and the assembled battery 102 are connected by a harness in which a plurality of voltage detection lines, a connection line of a temperature sensor (not illustrated) of the single cell 101, and the like are tied in a bundle.

The following operations are performed after the activation of the battery system 100. The battery controller 500 transmits an instruction to measure the OCV (open circuit voltage) of the single cells 101 to the cell controller 200 via the insulating element group 400. Data on the OCV of the single cells 101 measured on the instruction is transmitted on a cell group basis from the cell controller 200 to the battery controller 500 via the insulating element group 400.

The battery controller 500 converts the received OCV of the single cells 101 into the SOC, and calculates the deviations of the SOC of the single cells 101. The single cell 101 having the deviation of the SOC larger than a predetermined value is targeted for balancing discharge. The time required until the deviation of the SOC of the single cell 101 targeted for balancing discharge becomes zero is calculated. An instruction to perform a control operation to turn on a balancing switch in the integrated circuit 300 only during this time is transmitted from the battery controller 500 to the cell controller 200. The cell controller 200 performs balancing discharge on the balancing-target single cell 101 on the instruction.

After the SOC of the assembled battery 102 is calculated from the OCV of the single cells 101 measured above, the inverter 700 or the vehicle controller (not illustrated) being the high-level controller turns on the relays 600 and 610. The battery system 100 is connected to the inverter 700 and the motor 800. If the inverter 700 receives a charge/discharge instruction from the vehicle controller, then the inverter 700 operates to drive the motor 800 and the charge/discharge operation of the battery system 100 is performed.

After the time when the relays 600 and 610 are turned on and the battery system 100 starts charging/discharging, the battery controller 500 uses the total voltage detection circuit 501 and the charge/discharge current detection circuit 502 to measure the total voltage and the charge/discharge current at every predetermined time interval. The battery controller 500 calculates the state of charge (SOC) and internal resistance (DCR) of the assembled battery 102 in real time from the obtained values of the total voltage and the charge/discharge current. Furthermore, an electric current or electric power with which the assembled battery 102 can be charged or discharged is calculated from these values in real time and transmitted to the inverter 700. The inverter 700 controls the charge/discharge current or electric power within a range of the current or power.

Figure 2:
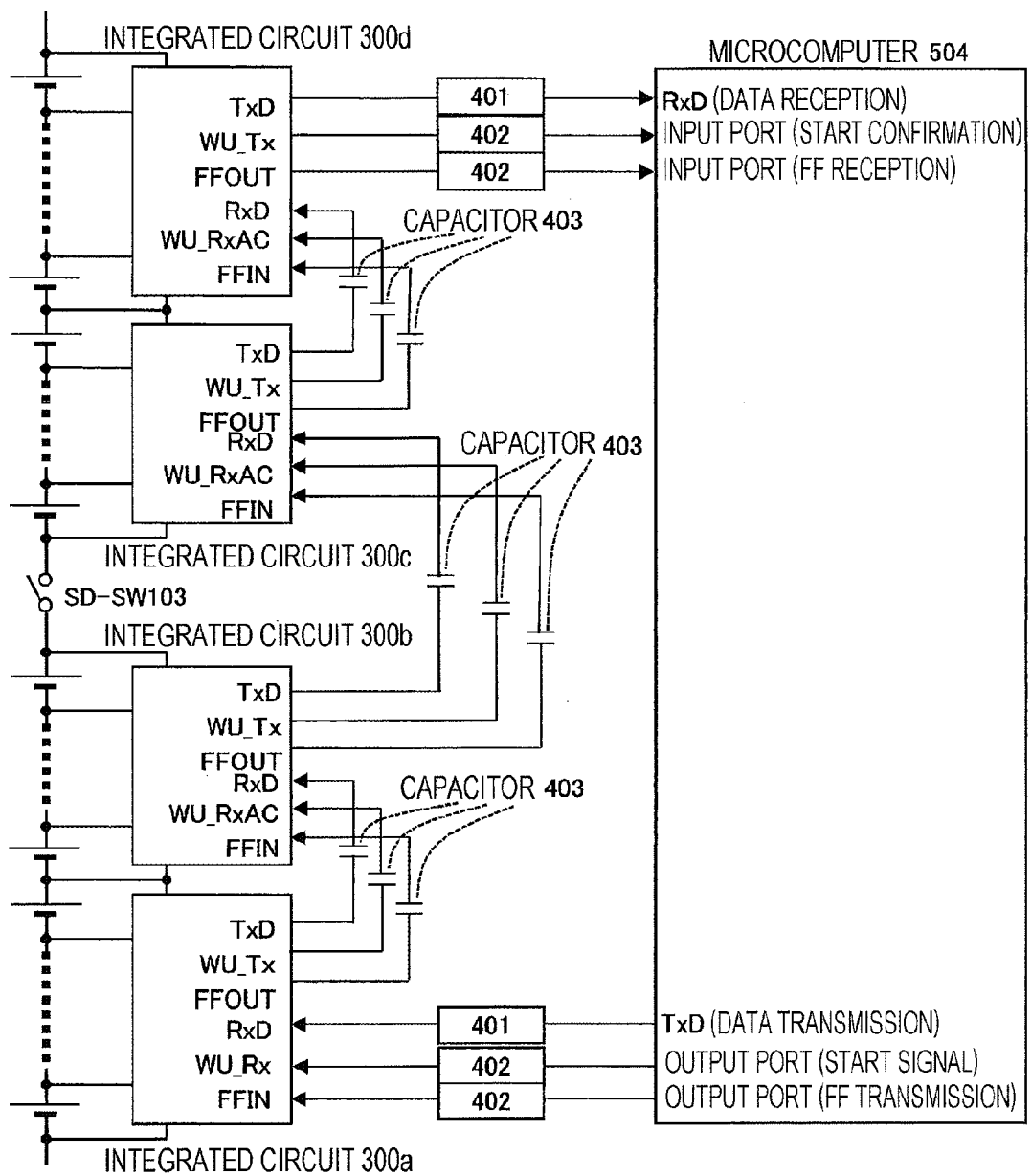
FIG. 2 is a diagram illustrating an example of communication connection between integrated circuits 300 in a cell controller 200 and a microcomputer 504 in a battery controller 500 according to the present invention.

FIG. 2 is a diagram illustrating an example of communication connection between integrated circuits 300a to 300d in the cell controller 200 and the microcomputer 504 in the battery controller 500 according to the present invention. The integrated circuits 300a to 300d of FIG. 2 correspond to the integrated circuits 300 of FIG. 1.

The microcomputer 504 includes a start signal output port for outputting a start signal to activate the integrated circuits 300a to 300d in the cell controller 200, a data transmission port TXD for transmitting a command and data, and an FF signal output port for outputting a data packet (an FF signal) to detect the overcharge state.

The example of FIG. 2 has a configuration in which two battery modules each having two series-connected cell groups each having the plurality of single cells 101 connected in series are arranged, one each above and below a service disconnect switch (SD-SW) 103. The number of the cell groups configuring the battery module is not limited to two but may be three or more. The integrated circuits 300a to 300d are provided, corresponding respectively to the cell groups. If simply referred to as the integrated circuit 300 in the following, the integrated circuits 300a to 300d are not particularly specified.

The SD-SW 103 is a switch usually used in a high voltage assembled battery or the like. The SD-SW 103 is opened at the time of a maintenance check to block a current path of the assembled battery 102 and prevent workers from electrical shock. If the SD-SW 103 is opened, the series connection between the battery modules is cut off. Accordingly, even if a person touches the highest and lowest terminals of the assembled battery 102, his/her body is not subjected to high voltage. Therefore, electrical shock can be prevented.

On a communication line of a command and a data signal, a command and a data signal are transmitted from the data transmission port TXD of the microcomputer 504 through a high-speed insulating element 401 to a communication receiving terminal RXD of the integrated circuit 300a corresponding to the cell group on the lowest potential side in the assembled battery 102. On the other hand, on a communication line of a start signal, a start signal is transmitted from the start signal output port of the microcomputer 504 through a low-speed insulating element 402 to a DC start signal input terminal WU_Rx of the integrated circuit 300a. Moreover, on a communication line of an FF signal, an FF signal is transmitted from the FF signal output port of the microcomputer 504 through the low-speed insulating element 402 to an FF input terminal FFIN of the integrated circuit 300a.

A communication output terminal TXD of the integrated circuit 300a corresponding to the cell group on the lowest potential side is connected via the capacitor 403 to a communication receiving terminal RXD of the integrated circuit 300b corresponding to the cell group one level above in the potential order. Moreover, an FF output terminal FFOUT and start output terminal WU_Tx of the integrated circuit 300a are respectively connected via the capacitors 403 to an FF input terminal FFIN and AC start signal input terminal WU_RxAC of the integrated circuit 300b.

Similarly, a communication output terminal TXD, FF output terminal FFOUT, and start output terminal WU_Tx of the integrated circuit 300b are respectively connected via the capacitors 403 to a communication receiving terminal RXD, FF input terminal FFIN, and AC start signal input terminal WU_RxA of the integrated circuit 300c corresponding to the cell group one level above in the potential order. Moreover, a communication output terminal TXD, FF output terminal FFOUT, and start output terminal WU_Tx of the integrated circuit 300c are respectively connected via the capacitors 403 to a communication receiving terminal RXD, FF input terminal FFIN, and AC start signal input terminal WU_RxAC of the integrated circuit 300d corresponding to the cell group one level above in the potential order, in other words, the cell group on the highest potential side.

It is necessary to perform communication between the integrated circuit 300b connected to the cell group below the SD-SW 103 and the integrated circuit 300c connected to the cell group above the SD-SW 103 through isolation. This is because if these communication lines are directly coupled, the battery modules arranged above and below the SD-SW 103 become connected in series through the connection. In this case, even if the SD-SW 103 is detached, the series connection between the battery modules is maintained. Accordingly, the passage of electric current of the assembled battery 102 cannot be blocked. Therefore, if each cell group includes a large number of the single cells 101 and the voltage across each cell group is high, a worker may receive an electrical shock. Hence, in the example of FIG. 2, the capacitors 403 are inserted between the integrated circuits 300b and 300c.

A communication output terminal TXD of the integrated circuit 300d corresponding to the cell group on the highest potential side is connected via the high-speed insulating element 401 to a data receiving port RXD of the microcomputer 504. Similarly, an FF output terminal FFOUT and start output terminal WU_Tx of the integrated circuit 300d are respectively connected via the low-speed insulating elements 402 to an FF signal input port and start signal input port of the microcomputer 504.

The high-speed insulating elements 401 and the low-speed insulating elements 402 used in the communication paths between the microcomputer 504 and the integrated circuits 300a and 300d are collectively illustrated as the insulating element group 400 in FIG. 1.

An insulating element such as a photocoupler that can transmit DC signals is used for the low-speed insulating element 402. The microcomputer 504 outputs a start signal being a DC signal from the start signal output port to the DC start signal input terminal WU_Rx of the integrated circuit 300a via the low-speed insulating element 402. The reason why the start signal is set to be a DC signal is because the influence of noise and a voltage change, which tend to occur at the activation of the battery system 100, is removed.

If the start signal from the microcomputer 504 is input into the DC start signal input terminal WU_Rx, the integrated circuit 300a is activated in response to this, and a start signal to activate the next integrated circuit 300b is output. At this point in time, the integrated circuit 300a outputs an AC start signal from its start output terminal WU_Tx via the capacitor 403 to the AC start signal input terminal WU_RxAC of the integrated circuit 300b. For example, a rectangular wave signal is output as the start signal.

If the start signal from the integrated circuit 300a is input into the AC start signal input terminal WU_RxAC, the integrated circuit 300b is activated in response to the start signal, and a start signal to activate the next integrated circuit 300c is output as in the case of the integrated circuit 300a. In other words, the integrated circuit 300b outputs the start signal being an AC signal from its start output terminal WU_Tx via the capacitor 403 to the AC start signal input terminal WU_RxAC of the integrated circuit 300c. A similar operation is performed also in the integrated circuit 300c afterward.

If the start signal from the integrated circuit 300c is input into the AC start signal input terminal WU_RxAC, and the integrated circuit 300d is activated, a start signal is output from the start output terminal WU_Tx of the integrated circuit 300d to the start signal input port of the microcomputer 504. If receiving the start signal, then the microcomputer 504 can confirm the activation of the integrated circuits 300a to 300d and recognize that the cell controller 200 has been activated.

After the activation of the cell controller 200, the microcomputer 504 transmits a command signal and data (a data packet) to the receiving terminal RXD of the integrated circuit 300a through the high-speed insulating element 401. The integrated circuit 300a receives the command signal and the data packet, and further transmits them from its output terminal TXD to the next integrated circuit 300b. In this manner, all the integrated circuits 300a to 300d receive the command signal and the data to perform an operation in accordance with the command signal and the data. In order to obtain data such as the voltage across each single cell 101 (referred to as the cell voltage) of the cell groups controlled respectively by the integrated circuits 300a to 300d, each of the integrated circuits 300a to 300d adds data to the data packet and transmits the data packet from its transmission terminal TXD to the RXD terminal of the next integrated circuit. The data packet is received by the data receiving port RXD of the microcomputer 504 in the end. The microcomputer 504 receives the data packet containing the command signal that the microcomputer 504 itself transmitted. Accordingly, the microcomputer 504 confirms that the command signal has been transferred normally and, if there is data added by the integrated circuits 300a to 300d, receives the data.

The loop of an FF signal passing through the FF input terminals FFIN and FF output terminals FFOUT of the integrated circuits 300a to 300d is a communication channel for detecting the overcharge or over-discharge state of the single cell 101. This is for detecting overcharge in a different system from the communication line passing through the TXD terminal and the RXD terminal to improve the reliability of detection of overcharge which is important to ensure the security of the single cell 101 using a lithium-ion battery. The FF signal is assumed to be a rectangular wave signal with a fixed cycle, and has, for example, a rectangular wave of 1 kHz in the normal state, and a rectangular wave of 2 kHz in the overcharge state.

If a rectangular wave of 1 kHz is input into the FF input terminal FFIN, the integrated circuit 300 recognizes that the integrated circuit 300 at a higher level in the communication order is in the normal state (not overcharged), and outputs a rectangular wave of 1 kHz from the FF output terminal FFOUT. On the other hand, if the cell voltage detection value of the integrated circuit 300 is detected to be an overcharge voltage, the integrated circuit 300 outputs a rectangular wave of 2 kHz from the FF output terminal FFOUT whether the frequency of the input signal of the FF input terminal FFIN is 1 kHz or 2 kHZ, and outputs the overcharge state to the next integrated circuit 300. Moreover, it is configured to not output a rectangular wave from the FF output terminal FFOUT if the frequency of the input signal of the FFIN terminal is a signal other than 1 kHz or 2 kHz.

Even if a certain integrated circuit 300 does not detect the overcharge voltage of the single cell 101 of the cell group controlled by the integrated circuit 300, when another integrated circuit 300 inputs a rectangular wave of 2 kHz into the FF input terminal FFIN, the relevant integrated circuit 300 outputs a rectangular wave of 2 kHz to the FF output terminal FFOUT. In this manner, the FF signal loop outputs that any of the integrated circuits 300 has detected overcharge. Consequently, the microcomputer 504 can detect overcharge from a different path from the high-speed communication signal loop.

The microcomputer 504 is configured to normally output a 1 kHz rectangular wave indicating the normal state as the FF signal to the integrated circuit 300a on the lowest potential side, putting the integrated circuit 300a at the highest level in the communication order. On the other hand, a 2 kHz rectangular wave indicating overcharge is required to be output when the operation of the FF loop is checked. In other words, even if all the integrated circuits 300a to 300d do not detect an overcharge voltage, as long as the rectangular wave of the returned FF signal is 2 kHz, the microcomputer 504 can confirm that the FF loop is in normal operation. Moreover, if a trouble occurs in the FF loop, for example, if a wire has been broken, a rectangular wave is not transmitted. Accordingly, the state can be identified.

Figure 3:
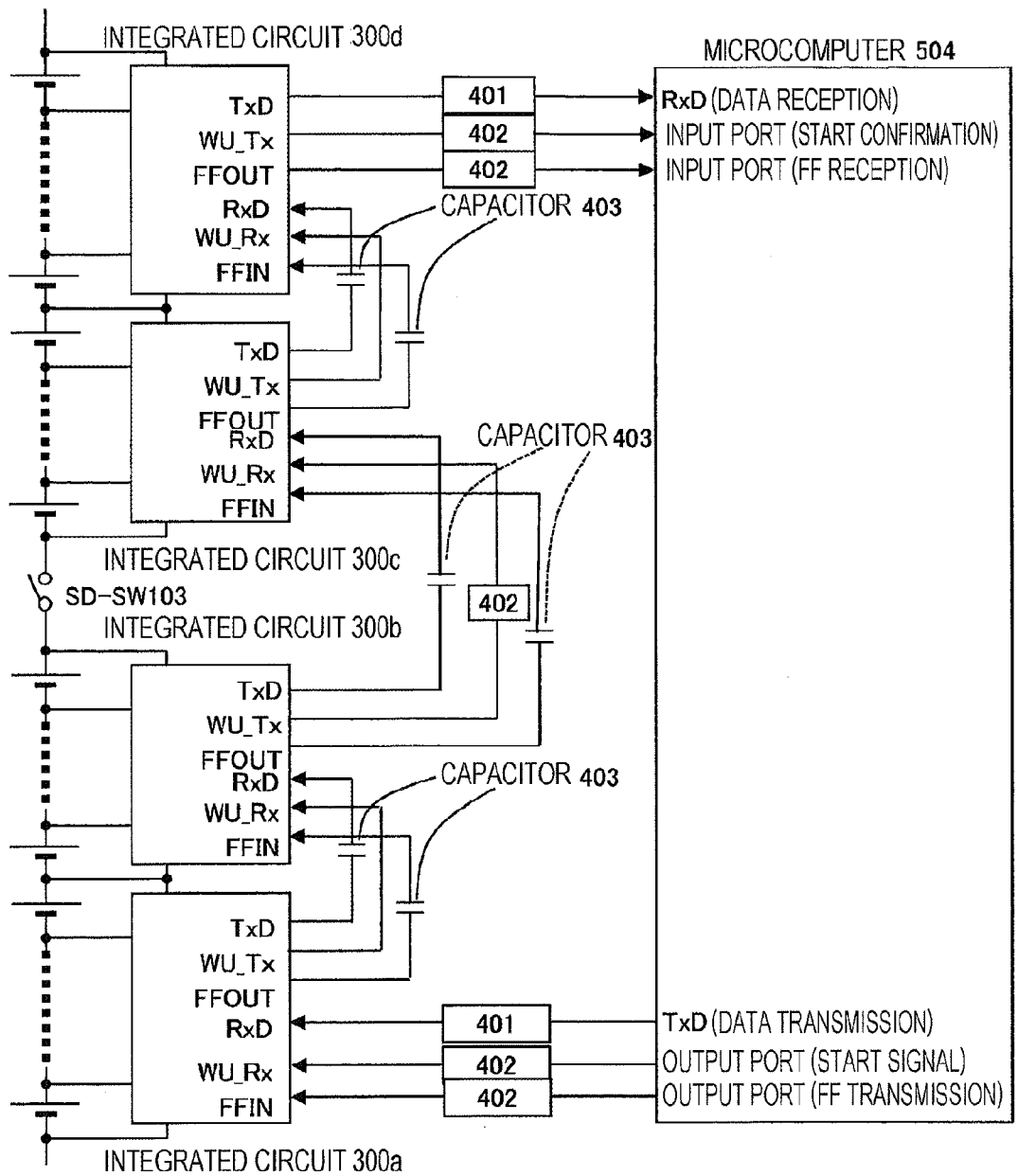
FIG. 3 is a diagram illustrating an example of communication connection between the integrated circuits 300 in the cell controller 200 and the microcomputer 504 in the battery controller 500 according to a conventional example.

The battery system according to the present invention described in the embodiment has features in the communication lines of start signals in the integrated circuits 300a to 300d in the cell controller 200. FIG. 3 is a diagram illustrating an example of communication connection between the integrated circuits 300a to 300d in the cell controller 200 and the microcomputer 504 in the battery controller 500 according to a conventional example, as a comparative example for describing the features of the battery system of the present invention.

Comparing FIGS. 2 and 3, a difference is in that the communication lines of start signals between the integrated circuits 300a to 300d are respectively connected via the capacitors 403 in FIG. 2 while being coupled via the low-speed insulating element 402 or directly coupled in FIG. 3. In other words, such a conventional example as illustrated in FIG. 3 is required to have such a connection form in order to input/output start signals being DC signals between the integrated circuits 300a to 300d.

Figure 4:
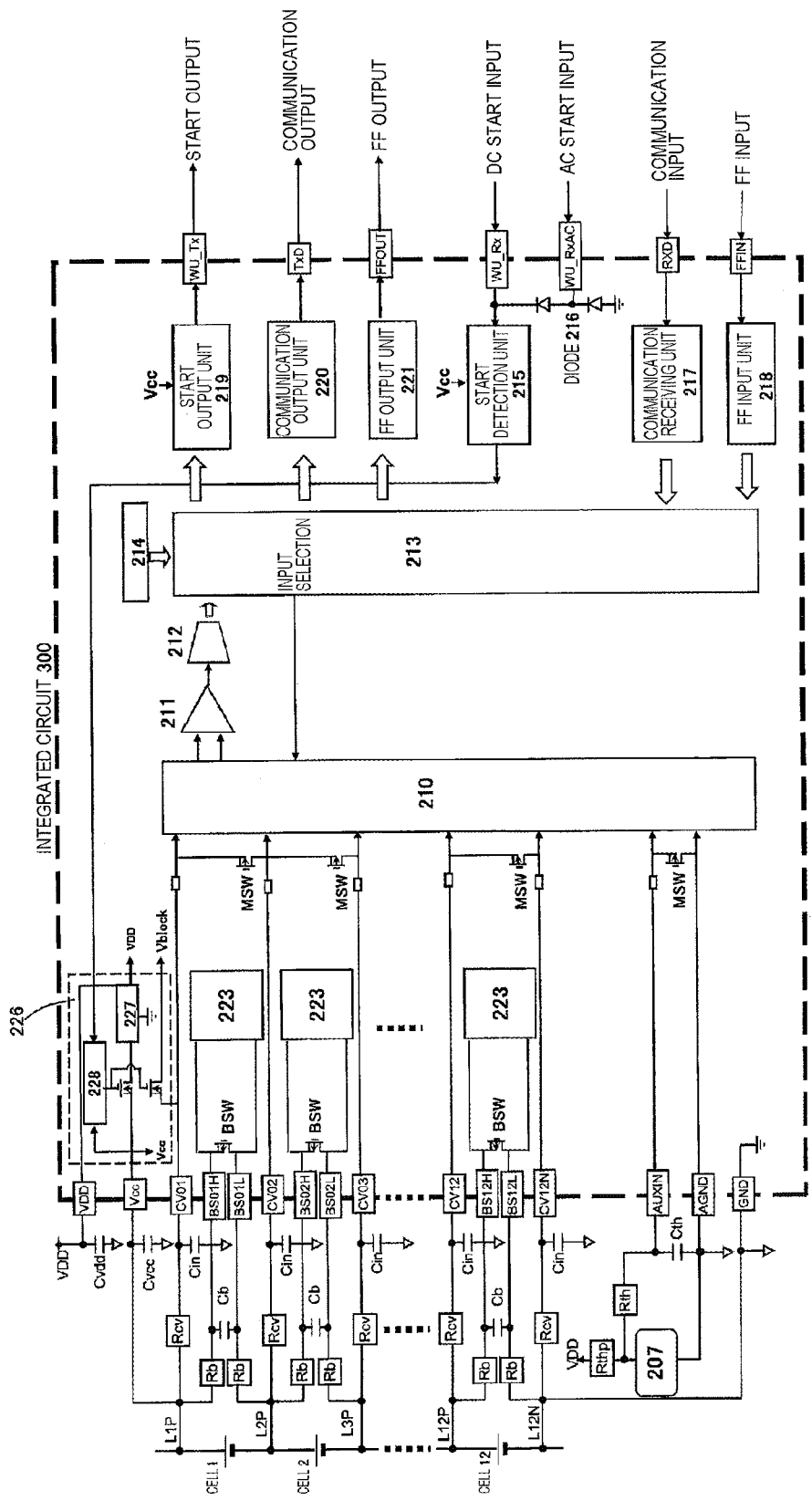
FIG. 4 is a diagram illustrating an internal configuration example of the integrated circuit 300 according to the present invention.

The internal configuration of the integrated circuit 300 is described. FIG. 4 is a diagram illustrating an internal configuration example of the integrated circuit 300 according to the present invention. In FIG. 4, it is configured that 12 single cells 101 (referred to as the cells 1 to 12) constitute one cell group.

A cell group and the integrated circuit 300 that controls the cell group are connected to CV terminals (terminals CV01 to CV12 and CV12N) for voltage detection and BS terminals (terminals BS01H to BS12H and terminals BS01L to BS12L) for performing a balancing operation via voltage detection lines L1P to L12P and L12N for detecting the voltages of the cells 1 to 12. Both ends, that is, the positive and negative electrode terminals of each of the cells 1 to 12 are respectively connected to the CV terminals via cell input resistors Rcv. A cell input capacitor Cin is connected between each CV terminal and a GND terminal.

Moreover, both ends of each of the cells 1 to 12 are respectively connected to the BS terminals through balancing resistors Rb. In the integrated circuit 300, balancing switches BSW for passing balancing current are respectively connected between the terminals BS01H to BS12H and the terminals BS01L to BS12L. If the balancing switch BSW corresponding to any of the cells is turned on, the balancing current of the cell flows via the balancing resistors Rb. Balancing terminal capacitors Cb are respectively connected between the BS terminals.

The CV terminals are connected to a multiplexer 210 in the integrated circuit 300. The multiplexer 210 is for selecting an arbitrary cell and outputting its positive and negative potentials, and is controlled in accordance with an output from a logic unit 213. A differential amplifier 211 converts the outputs of the multiplexer 210 into each of the voltages across the cells 1 to 12. An AD converter 212 then converts each voltage into a digital value. The operation of the AD converter 212 is controlled by the logic unit 213. The output of the AD converter 212 is processed in the logic unit 213. In other words, the differential amplifier 211 and the AD converter 212 measure voltage.

A multiplexer input short circuit switch MSW is provided between two voltage input lines adjacent to each other, in other words, voltage detection lines connected to a positive and a negative electrode of each cell among voltage input lines connected to the multiplexer 210.

Auxiliary input terminals AUXIN and AGND are provided to the integrated circuit 300. These auxiliary input terminals AUXIN and AGND are connected to a thermistor 207, a thermistor dividing resistor Rthp, a thermistor input resistor Rth, and a thermistor input capacitor Cth.

The resistance value of the thermistor 207 varies significantly with the temperature of its installed location. The thermistor 207 and the thermistor dividing resistor Rthp in series divide the VDD voltage. The voltage across the thermistor 207 is input from the auxiliary input terminals AUXIN and AGND into the integrated circuit 300. The thermistor input resistor Rth and the thermistor input capacitor Cth act as an RC filter that removes the noise of the input signal. In other words, the noise of the voltage across the thermistor 207, the voltage changing depending on temperature, is removed by the RC filter and the voltage is input into the integrated circuit 300.

If the voltage across the thermistor 207 input into the integrated circuit 300 is selected by the multiplexer 210, the voltage value is digitized via the differential amplifier 211 and the AD converter 212. The digitized value of the voltage across the thermistor 207 is input into the logic unit 213.

The logic unit 213 transmits the digitized voltage across the thermistor 207 as a data signal from the communication output terminal TXD via a communication output unit 220. The data signal is transmitted to the battery controller 500 via the above-mentioned communication line and accordingly the digitized voltage across the thermistor 207 is transmitted. The battery controller 500 calculates the temperature of the location where the thermistor 207 is installed based on the voltage across the thermistor 207. The temperature can be calculated using a relational expression between the voltage across the thermistor 207 and temperature preset based on the resistance-temperature characteristic of the thermistor 207, or tabulated data of the relationship between the voltage across the thermistor 207 and temperature.

A balancing switch state detection circuit 223 detects the presence or absence of balancing current and diagnoses the balancing switch BSW. These results are output to the logic unit 213 and stored in a register in the logic unit 213.

The logic unit 213 includes the register which stores data for controlling various switches provided to the integrated circuit 300. For example, data for selecting the input of the multiplexer 210, data for controlling the multiplexer input short circuit switch MSW, data for controlling the balancing switch BSW, and data for controlling a switch circuit of the balancing switch state detection circuit 223 are stored in the register. A clock signal from an oscillation circuit 214 is input into the logic unit 213. The clock signal is used to operate the logic unit 213.

An operating power supply Vcc of the integrated circuit 300 is supplied from a Vcc terminal connected to the voltage detection line L1P. A capacitor Cvcc for suppressing noise is connected to the Vcc terminal. The voltage detection line L1P is connected to the positive electrode side of the cell 1. The voltage at the positive electrode of the cell 1 is supplied as the operating power supply Vcc to the integrated circuit 300.

The Vcc terminal is further connected to a power supply unit 226 in the integrated circuit 300. The power supply unit 226 includes a regulator 227. The regulator 227 uses the operating power supply Vcc supplied from the Vcc terminal to generate an operating power supply VDD of 3.3 V and supply it to the logic unit 213 and the like. The operating power supply VDD is also supplied to a circuit outside the integrated circuit 300 via a VDD terminal of the integrated circuit 300. A capacitor Cvdd for stabilizing operation is connected to the VDD terminal.

The power supply unit 226 includes also a starting circuit 228 which operates in response to a start detection signal from the start detection unit 215. If an AC start signal from the integrated circuit 300 at a lower level in the communication order is input into the AC start signal input terminal WU_RxAC, or if a DC start signal from the microcomputer 504 is input into the DC start signal input terminal WU_Rx, the start detection unit 215 detects the signal and outputs a start detection signal into the power supply unit 226. If the start detection signal is input from the start detection unit 215, the starting circuit 228 outputs the operating power supply Vcc to the regulator 227 and also activates the integrated circuit 300 to perform a POR (power-on reset) operation. Diodes 216 being rectifying elements for doubling and rectifying the voltage of the AC start signal and outputting the start detection signal to the start detection unit 215 are connected to the AC start signal input terminal WU_RxAC in the integrated circuit 300.

If the integrated circuit 300 is activated, a start output unit 219 operates with the output from the logic unit 213. The start output unit 219 outputs an AC (rectangular wave) start signal from the start output terminal WU_Tx to the integrated circuit 300 at a higher level in the communication order or the microcomputer 504.

The start detection unit 215 is connected to the Vcc terminal. Consequently, even while the operation of the entire integrated circuit 300 is being suspended, the operating power supply Vcc is supplied to the start detection unit 215. The start detection unit 215 has such a circuit configuration as to reduce the current consumed as much as possible.

The communication output unit 220 outputs a command signal and data from the communication output terminal TXD to the integrated circuit 300 at a higher level in the communication order or the microcomputer 504 based on the output data from the logic unit 213. If the command signal and data are input into the receiving terminal RXD from the integrated circuit 300 at a lower level in the communication order or the microcomputer 504, a communication receiving unit 217 receives the command signal and data to output them to the logic unit 213.

An FF output unit 221 outputs such an FF signal as described above from the FF output terminal FFOUT to the integrated circuit 300 at a higher level in the communication order or the microcomputer 504 based on the output data from the logic unit 213. If the FF signal is input into the FF input terminal FFIN from the integrated circuit 300 at a lower level in the communication order or the microcomputer 504, the FF input unit 218 receives the FF signal, determines which of the normal state and the overcharge state the FF signal represents, and outputs the determination result to the logic unit 213.

Figure 5:
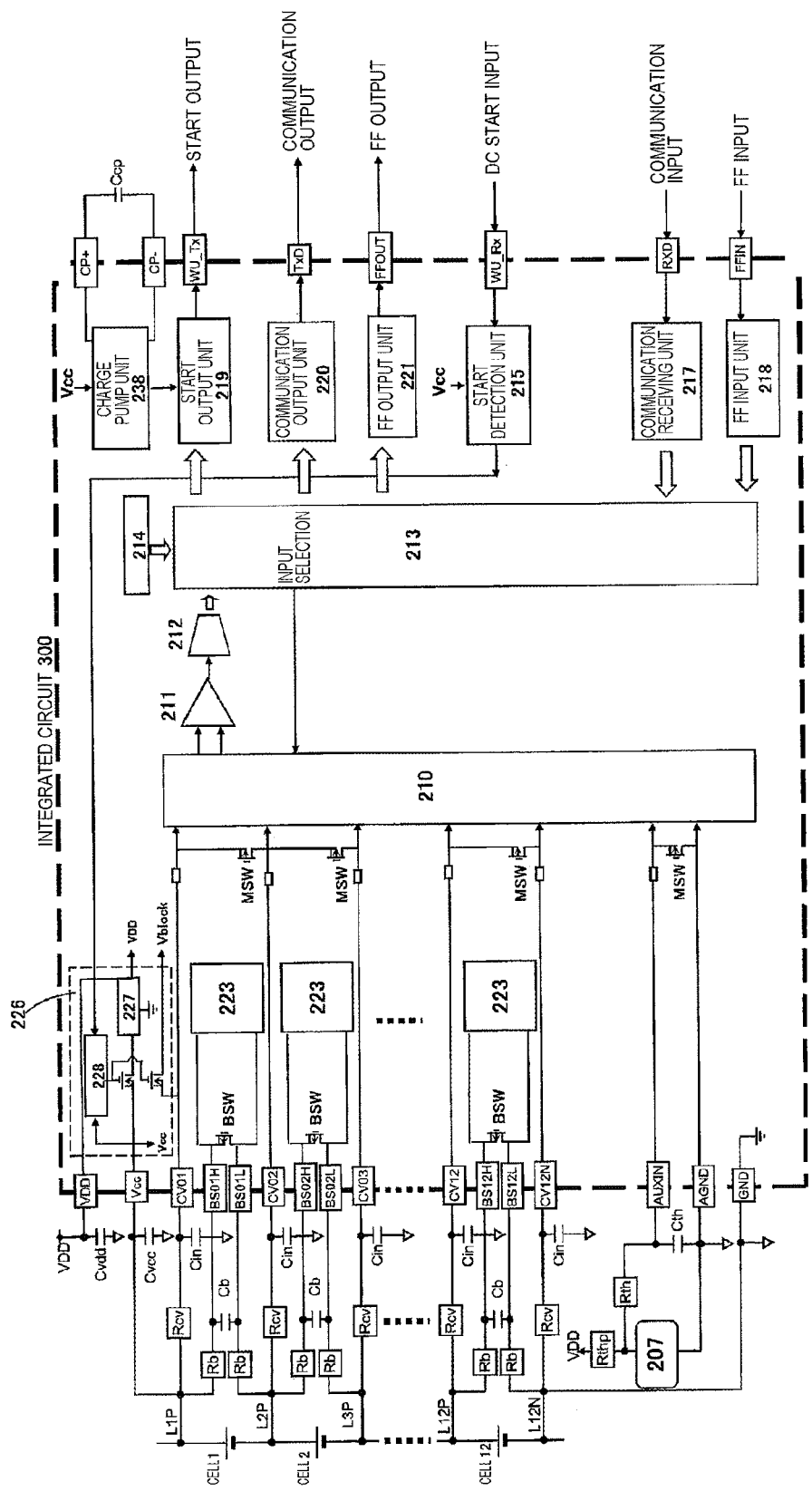
FIG. 5 is a diagram illustrating an internal configuration example of the integrated circuit 300 according to the conventional example.

The internal configuration of the integrated circuit 300 according to the conventional example is described as a comparative example. FIG. 5 is a diagram illustrating an internal configuration example of the conventional integrated circuit 300 used to input/output a start signal being a DC signal in the connection example illustrated in FIG. 3.

Comparing FIGS. 4 and 5, the integrated circuit 300 of FIG. 5 is provided with terminals CP+ and CP− connected to a charge pump unit 238 and a charge pump capacitor Ccp. The charge pump unit 238 in the integrated circuit 300 generates charge pump voltage using the operating power supply Vcc in cooperation with the charge pump capacitor Ccp connected to the outside of the integrated circuit 300, and supplies the charge pump voltage to the start output unit 219. In the conventional example, such a circuit is required to output a start signal at a higher voltage than the operating power supply Vcc in accordance with the potential of the cell group corresponding to the integrated circuit 300 of an output destination.

Moreover, the integrated circuit 300 of FIG. 5 does not include the AC start signal input terminal WU_RxAC of FIG. 4 for receiving an AC start signal, and the diodes 216.

FIG. 5 illustrates the internal configuration example of the integrated circuit 300 of the case of the connection example illustrated in FIG. 3, in other words, the case where DC start signals are input/output sequentially from the lowest potential side in the communication order opposite to the potential order of the assembled battery 102. However, contrary to this, DC start signals may be input/output sequentially from the highest potential side in the same communication order as the potential order of the assembled battery 102. In this case, a start signal at a higher voltage than the operating power supply Vcc is input into the start detection unit 215 in accordance with the potential of the cell group corresponding to the integrated circuit 300 which has output the start signal. Hence, the need of the charge pump unit 238 and the charge pump capacitor Ccp is eliminated. However, it is necessary to provide an interface circuit, a protection circuit, and the like instead to enable the start detection unit 215 to operate normally even if a high voltage start signal is input.

Figure 6:
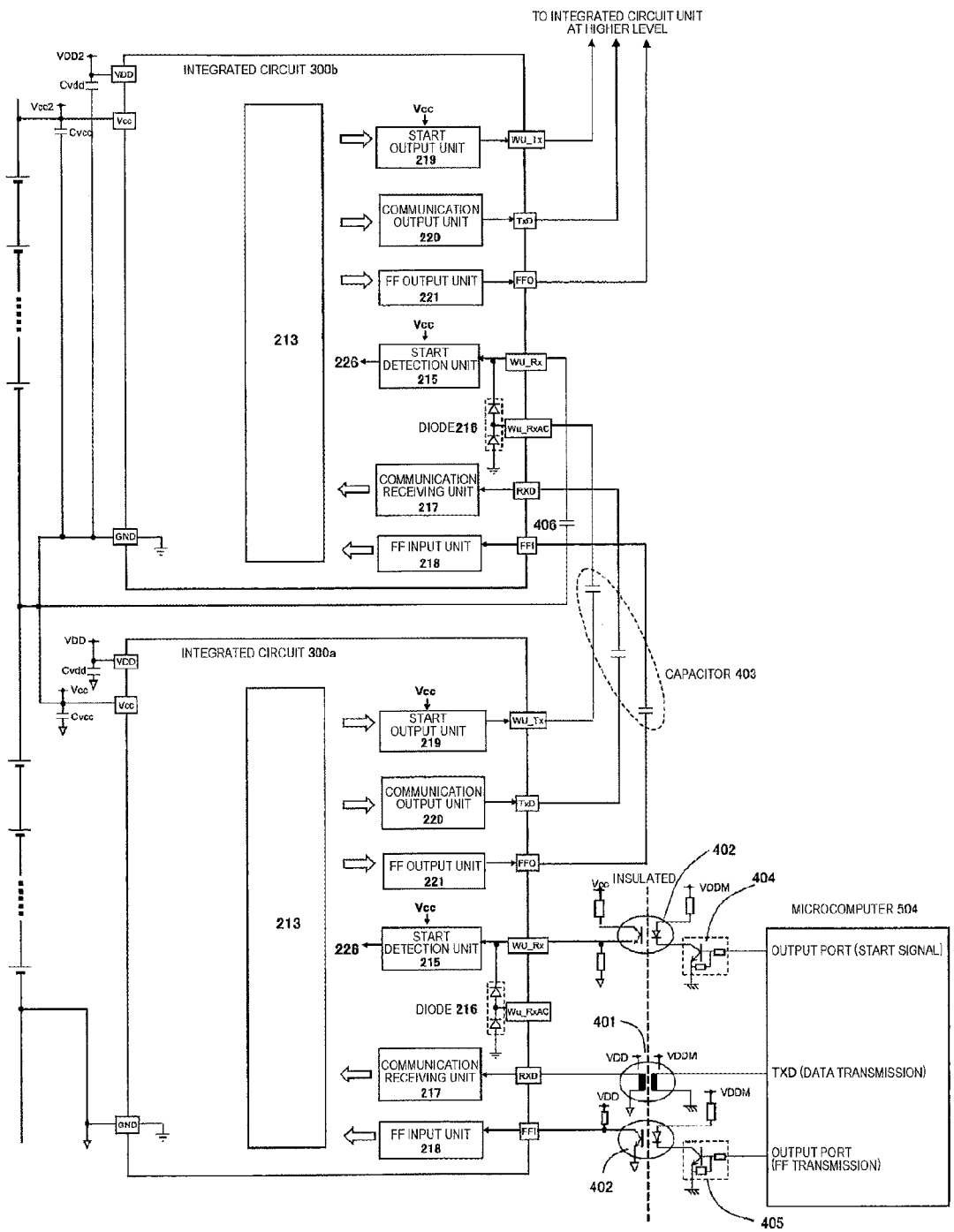
FIG. 6 is a diagram illustrating a detailed example of communication connection between an integrated circuit 300a on the lowest potential side, an integrated circuit 300b one level above the integrated circuit 300a in the potential order, and the microcomputer 504.
Figure 7:
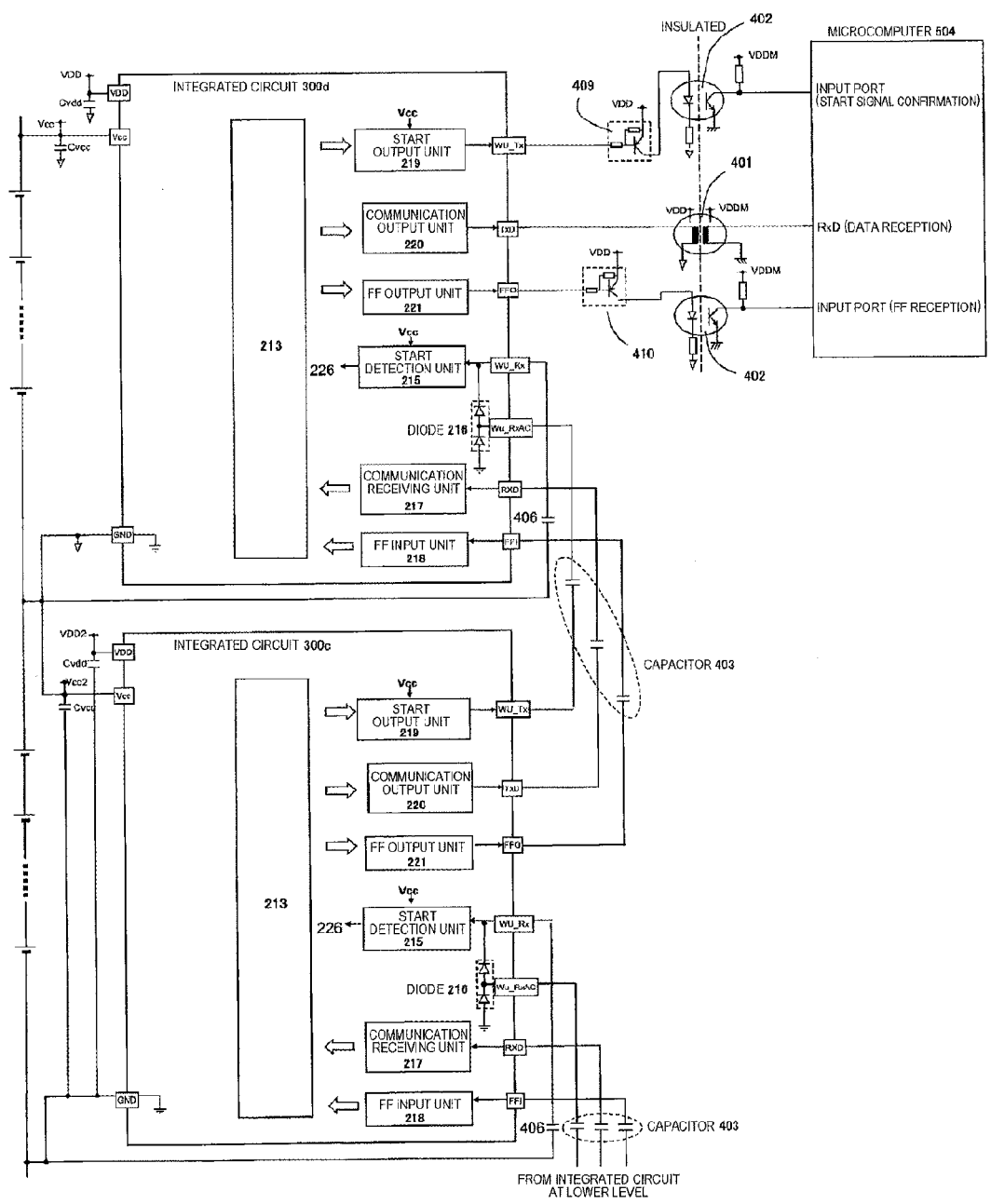
FIG. 7 is a diagram illustrating the detailed example of communication connection between an integrated circuit 300d on the highest potential side, an integrated circuit 300c one level below the integrated circuit 300d in the potential order, and the microcomputer 504.

A description is given in detail of the input/output of start signals between the integrated circuits 300a to 300d and the microcomputer 504 of FIG. 2. FIG. 6 is a diagram illustrating a detailed example of communication connection between the integrated circuit 300a on the lowest potential side, the integrated circuit 300b one level above the integrated circuit 300a in the potential order, and the microcomputer 504 in FIG. 3. Moreover, FIG. 7 is a diagram illustrating the detailed example of communication connection between the integrated circuit 300d on the highest potential side, the integrated circuit 300c one level below the integrated circuit 300d in the potential order, and the microcomputer 504 in FIG. 3.

In FIG. 6, the integrated circuit 300a on the lowest potential side is at the highest level in the communication order. In the integrated circuit 300a, the DC start signal input terminal WU_Rx is used to input a DC start signal output from the microcomputer 504. A photocoupler is connected as the low-speed insulating element 402 to this terminal. The microcomputer 504 passes current through a diode of the photocoupler via a drive transistor 404, which turns on a transistor side insulated from the diode in the photocoupler. The transistor is connected on its collector side to Vcc of the integrated circuit 300a via a resistor, and connected on its emitter side to a ground via a resistor. When the transistor side of the photocoupler is turned on, a voltage obtained by dividing Vcc by the resistor is applied to the DC start signal input terminal WU_Rx of the integrated circuit 300a. The start detection unit 215 is a comparator including a preset threshold value, and outputs a start detection signal to the power supply unit 226 (see FIG. 4) if detecting a voltage equal to or more than the threshold value. Consequently, the integrated circuit 300a is activated.

If the integrated circuit 300a is activated as described above, the start output unit 219 of the integrated circuit 300a outputs an AC start signal from the start output terminal WU_Tx at the instruction of the logic unit 213. It is assumed here that a rectangular wave signal is output as the AC start signal. The signal is applied through the capacitor 403 to the AC start signal input terminal WU_RxAC of the integrated circuit 300b that is one level above in the potential order and one level below in the communication order.

In the integrated circuit 300b, the AC start signal input terminal WU_RxAC is connected to the diodes 216 connected between the ground and the DC start signal input terminal WU_Rx. The diodes 216 and the capacitor 406 connected between the DC start signal input terminal WU_Rx and the ground are part of the components of the doubler rectifier circuit. If being input into the AC start signal input terminal WU_RxAC in the integrated circuit 300b, the rectangular wave signal as the AC start signal output from the integrated circuit 300a is rectified by the doubler rectifier circuit and converted into DC voltage. The DC voltage is input into the start detection unit 215 and accordingly a start detection signal is output from the start detection unit 215 to activate the integrated circuit 300b.

The diodes 216 are connected between the ground and the DC start signal input terminal WU_Rx also in the integrated circuit 300a, and are connected to the AC start signal input terminal WU_RxAC. However, the DC start signal from the microcomputer 504 input into the DC start signal input terminal WU_Rx of the integrated circuit 300a is input into the start detection unit 215 not via the diodes 216. Hence, the DC start signal can be detected by the start detection unit 215.

Figure 8:
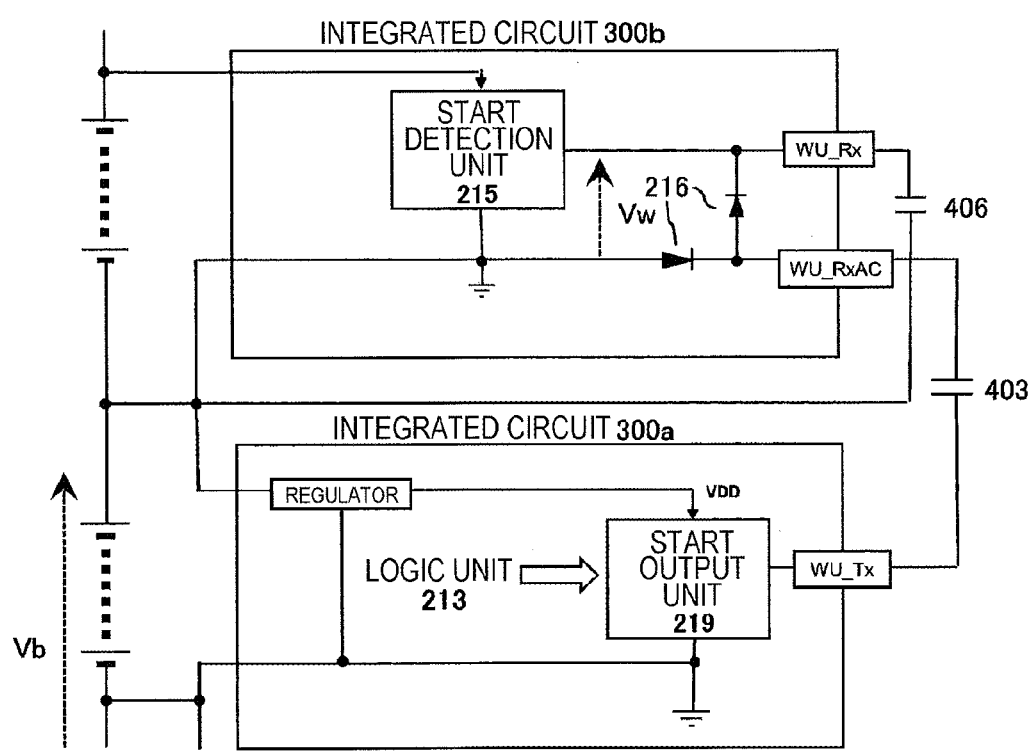
FIG. 8 is a diagram illustrating a part related to a communication path of an AC start signal between the integrated circuits 300a and 300b in a readily understandable manner.
Figure 9:
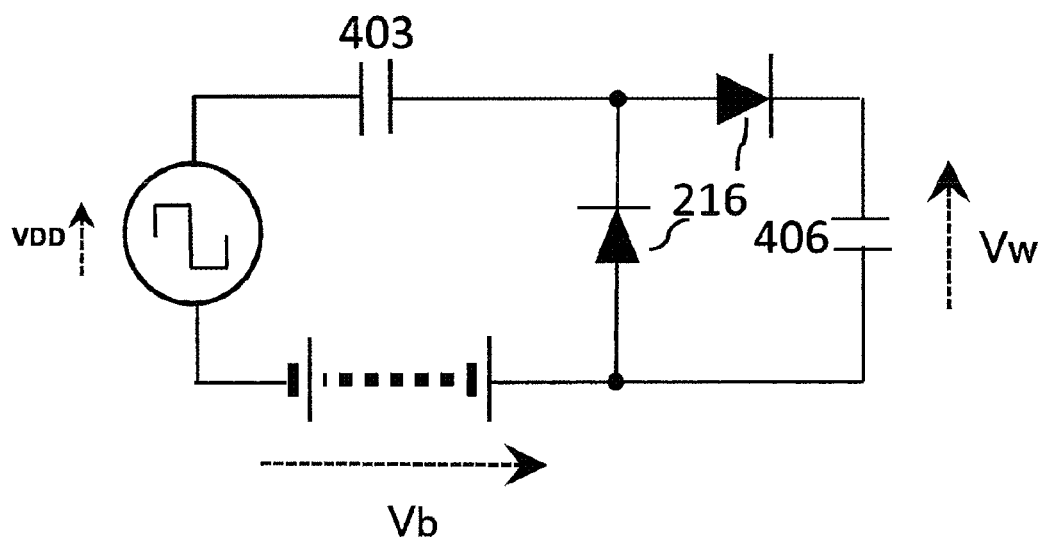

FIG. 8 illustrates a part related to the communication path of an AC start signal between the integrated circuits 300a and 300b in a readily understandable manner. Within the part, FIG. 9 is an equivalent circuit diagram corresponding to the cell group connected to the diodes 216, the capacitor 403 connected between the start output terminal WU_Tx of the integrated circuit 300a and the AC start signal input terminal WU_RxAC of the integrated circuit 300b, the capacitor 406, and the integrated circuit 300a. The circuit illustrated in FIG. 9 is a general doubler rectifier circuit. If a rectangular wave signal with an amplitude VDD is output from the start output terminal WU_Tx of the integrated circuit 300a, a fixed DC voltage Vw is applied by the doubler rectifier circuit to the start detection unit 215 of the integrated circuit 300b.

FIG. 10 illustrates a voltage waveform example of a rectangular wave signal with the amplitude VDD output from the start output terminal WU_Tx of the integrated circuit 300a, and the DC voltage Vw applied to the start detection unit 215 of the integrated circuit 300b. In FIG. 10, the left vertical axis represents the voltage values of a rectangular wave signal, and the right vertical axis represents the voltage values of DC voltage. As illustrated in the example, if a rectangular wave signal at a frequency of 32 kHz and an amplitude of 3.3 Vp-p is output as the AC start signal from the integrated circuit 300a, a DC voltage of approximately 2.5 V is applied to the start detection unit 215 of the integrated circuit 300b. The DC voltage rises up to a voltage equal to or more than approximately 90% in approximately 0.1 ms after the start of the output of the rectangular wave. Consequently, it can be seen that the starting time from the output of the AC start signal by the integrated circuit 300a to the activation of the integrated circuit 300b is sufficiently short. The capacity of the capacitor 406 is set to 0.01 µF.

Return to the description of FIG. 6. In the integrated circuit 300a of FIG. 6, a digital isolator using, for example, a small transformer for communication as the high-speed insulating element 401 is connected to the communication receiving terminal RXD connected to the communication receiving unit 217. A command and communication data which are transmitted from the microcomputer 504 are input into the communication receiving unit 217 from the communication receiving terminal RXD of the integrated circuit 300a through the digital isolator. The VDD terminal of the integrated circuit 300a supplies the operating power supply VDD to the digital isolator. The operating power supply VDD is not output during the suspension of the operation of the integrated circuit 300a. Therefore, dark current does not flow through the digital isolator at this point in time.

Moreover, a photocoupler is connected as the low-speed insulating element 402 to the FF input terminal FFIN connected to the FF input unit 218 of the integrated circuit 300a as in the case of the DC start signal input terminal WU_Rx. The microcomputer 504 passes current through a diode of the photocoupler via a drive transistor 405. Accordingly, a transistor side insulated from the diode in the photodiode is turned on to transmit an FF signal.

In FIG. 7, the integrated circuit 300d on the highest potential side is at the lowest level in the communication order. The AC start signal of a rectangular wave output by the start output unit 219 of the integrated circuit 300d from the start output terminal WU_Tx is input into the start signal input port of the microcomputer 504 via a drive transistor 409 and a photocoupler being the low-speed insulating element 402. If receiving the AC start signal output from the integrated circuit 300d, then the microcomputer 504 can confirm that all the integrated circuits 300a to 300d have been activated.

Moreover, the command and communication data output by the communication output unit 220 of the integrated circuit 300d from the communication output terminal TXD are input into the data receiving port RXD of the microcomputer 504 via a digital isolator being the high-speed insulating element 401. The VDD terminal of the integrated circuit 300d supplies the operating power supply VDD to the digital isolator. Furthermore, the FF signal output by the FF output unit 221 of the integrated circuit 300d from the FF output terminal FFOUT is input into the FF signal input port of the microcomputer 504 via a drive transistor 410 and a photocoupler being the low-speed insulating element 402. The microcomputer 504 may confirm that all the integrated circuits 300a to 300d have been activated by receiving them from the integrated circuit 300d.

The embodiment described above has the following operations and effects.

(1) The battery monitoring and control integrated circuit 300 is configured by the diodes 216, the capacitor 403, and the capacitor 406, and includes the AC start signal input terminal WU_RxAC for connecting to the doubler rectifier circuit which generates a DC signal based on an AC start signal input from the integrated circuit 300 at a higher level in the communication order connected via the capacitor 403, the start detection unit 215 which detects the DC signal and activates the relevant integrated circuit 300, and the start output unit 219 which outputs the AC start signal to the integrated circuit 300 at a lower level in the communication order or the microcomputer 504 of the battery controller 500 after the activation of the relevant integrated circuit 300. Consequently, compared with the conventional case using a DC start signal, it is not necessary for the integrated circuit 300 to include a charge pump circuit for outputting a start signal at a higher voltage than the operating power supply Vcc, and an interface circuit, a protection circuit, and the like for enabling the start detection unit 215 to operate normally even if a high voltage start signal is input. Therefore, the need of special circuits to input/output a start signal can be eliminated.

(2) The doubler rectifier circuit includes the diodes 216 built in the integrated circuit 300. Hence, the doubler rectifier circuit can easily be configured by connecting capacitors with an appropriate capacity as the capacitors 403 and 406 outside the integrated circuit 300.

(3) The integrated circuit 300 further includes the DC start signal input terminal WU_Rx for inputting a DC start signal input from the microcomputer 504. The DC start signal input into the DC start signal input terminal WU_Rx is input into the start detection unit 215 not via the doubler rectifier circuit. Hence, the DC start signal can be detected in the start detection unit 215 in a similar detection method to that of the AC start signal input via the doubler rectifier circuit.

An example of the embodiment of the present invention has been described above. However, the present invention is not limited to this. Those skilled in the art can make various modifications without impairing the features of the present invention.

For example, in the embodiment, a start signal, a command and communication data, and an FF signal are transmitted between the integrated circuits 300 in the communication order opposite to the potential order of the assembled battery 102. However, the communication order may be reversed. In other words, a start signal, a command and communication data, and an FF signal can be transmitted between the integrated circuits 300 also in the same communication order as the potential order of the assembled battery 102. In the present invention, all of these signals are transmitted between the integrated circuits 300 via the capacitors 403. Accordingly, the relationship between the potential order and the communication order is not particularly limited.

Moreover, the communication signal and FF signal, which are described in the embodiment, may be differential signals to make resistant to noise. Furthermore, an AC start signal of a rectangular wave or the like may be output from the battery controller 500, and input into the AC start signal input terminal WU_RxAC of the integrated circuit 300 at the highest level in the communication order. Alternatively, a start signal and communication signal or FF signal from the battery controller 500 may be shared. Communication signals and FF signals are transmitted from the battery controller 500 all the time during the operation of the battery controller 500. Hence, it is possible to generate a DC signal from these signals and use the DC signal as a start signal in the integrated circuit 300.

Various modifications described above may be applied individually or may be freely combined to be applied.

The scope of the present invention is not limited to a battery system having the configuration described in the embodiment. The present invention can be applied to battery systems having various configurations, and to electrically driven vehicles having various specifications.

The invention claimed is:

1. A battery monitoring and control integrated circuit which is connected to a cell group having a plurality of series-connected single cells, and which monitors and controls the single cells, the battery monitoring and control integrated circuit comprising:
   a first start input terminal for connecting to a DC signal generation circuit which generates a DC signal based on an AC start signal input;
   a start detection unit which detects the DC signal and activates the battery monitoring and control integrated circuit; and
   a start output unit which outputs the AC start signal after the activation of the battery monitoring and control integrated circuit.

2. The battery monitoring and control integrated circuit according to claim 1, wherein the DC signal generation circuit is a doubler rectifier circuit.

3. The battery monitoring and control integrated circuit according to claim 2, wherein the doubler rectifier circuit includes a rectifying element built in the battery monitoring and control integrated circuit.

4. The battery monitoring and control integrated circuit according to claim 1, further comprising a second start input terminal for inputting a DC start signal input from the outside, wherein the DC start signal input into the second start input terminal is input into the start detection unit not via the DC signal generation circuit.

5. A battery system comprising:
   a plurality of cell groups each having a plurality of series-connected single cells;
   a plurality of battery monitoring and control integrated circuits which is respectively connected to the plurality of cell groups and monitors and controls the single cells of the cell groups; and
   a battery controller which controls the plurality of battery monitoring and control integrated circuits, wherein
   the plurality of battery monitoring and control integrated circuits is connected to each other via capacitors in a predetermined communication order, and
   the plurality of battery monitoring and control integrated circuits each include
      a first start input terminal for connecting to a DC signal generation circuit which generates a DC signal based on an AC start signal input from the battery controller or a battery monitoring and control integrated circuit at a higher level in the communication order,
      a start detection unit which detects the DC signal and activates the battery monitoring and control integrated circuit, and
      a start output unit which outputs the AC start signal to a battery monitoring and control integrated circuit at a lower level in the communication order or the battery controller after the activation of the battery monitoring and control integrated circuit.

6. The battery system according to claim 5, wherein the DC signal generation circuit is a doubler rectifier circuit.

7. The battery system according to claim 6, wherein the doubler rectifier circuit includes a rectifying element built in the battery monitoring and control integrated circuit.

8. The battery system according to claim 5, wherein
   the plurality of battery monitoring and control integrated circuits each further include a second start input terminal for inputting a DC start signal input from the battery controller, and
   the DC start signal input into the second start input terminal is input into the start detection unit not via the DC signal generation circuit.

* * * * *